Patented Sept. 4, 1945

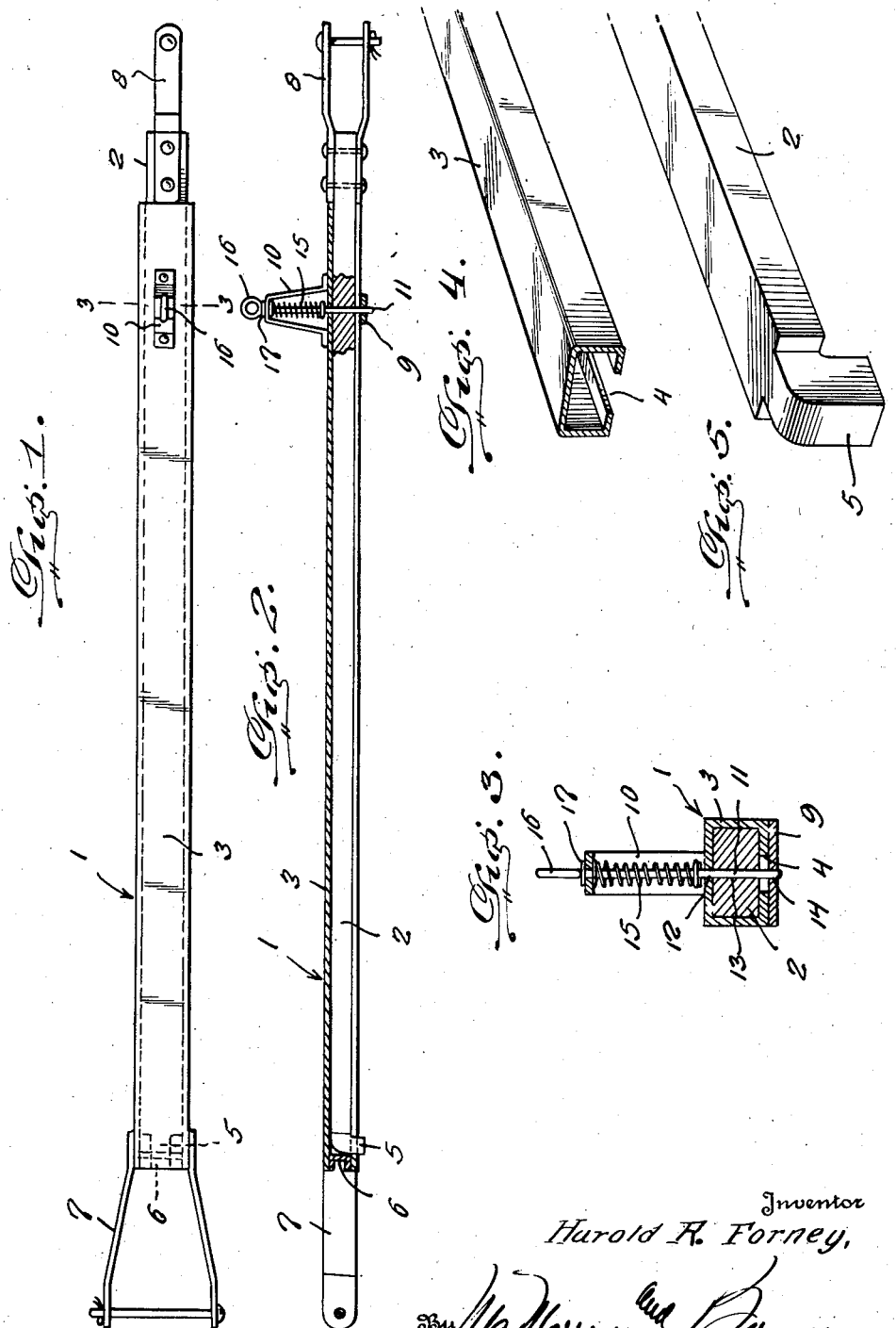

2,384,245

UNITED STATES PATENT OFFICE 2,384,245

DRAFT HITCH

Harold R. Forney, Surprise, Nebr.

Application June 7, 1944, Serial No. 539,119

3 Claims. (Cl. 280—33.14)

This invention relates to new and useful improvements in draft hitches for use particularly on agricultural implements although it will be understood, of course, that the device may be used for any other purpose for which it may be found adapted.

The primary object of this invention is to provide, in a draft hitch of the character described comprising a bar including a pair of telescopic members adapted to be extended to facilitate connection with a tractor or other towing vehicle, unique means for automatically latching said bar in unextended or towing position after the coupling operation has been completed.

Other objects of the invention are to provide a draft hitch of the character set forth which will be strong, durable, compact, light in weight and which may be manufactured at comparatively low cost.

All of the foregoing and still further objects of the invention will be apparent from a study of the following specification, taken in connection with the accompanying drawing wherein like characters of reference designate corresponding parts throughout the several views, and wherein:

Figure 1 is a top plan view of a draft hitch constructed in accordance with the present invention.

Figure 2 is a view in vertical longitudinal section through the device.

Figure 3 is a view in transverse section, taken substantially on the line 3—3 of Figure 1.

Figure 4 is a perspective view of a portion of the female member.

Figure 5 is a perspective view of an end portion of the male member.

Referring specifically to the drawing, it will be seen that a longitudinally extensible bar of suitable metal is designated generally by reference character 1. The bar 1 includes a solid inner or male member 2 of substantially rectangular transverse section which is slidable longitudinally in a tubular, metallic outer or female member 3. The member 3 conforms substantially to the transverse sectional shape of the member 2 and has formed in its lower portion a longitudinal slot 4. The member 2 comprises a reduced, downturned rear end portion constituting a guide lug 5 which is operable in the slot 4.

The member 3 is closed at its rear end, as at 6, and open at its front end. A clevis 7, for connection to an implement, is welded on the rear end portion of the member 3. The front end portion of the member 2 projects beyond the corresponding end of the member 3 and has riveted or otherwise suitably secured thereon a clevis 8 to be connected to the usual draw bar of a tractor, for example.

Welded beneath the front portion of the member 3 is an apertured metallic plate 9 which traverses the slot 4. Mounted on top of the corresponding portion of the member 3 is a substantially U shaped guide 10. A locking pin 11 is slidable vertically in the guide 10, also in an opening 12 which is provided therefor in the top of the member 3. A vertical opening 13 is provided in the member 2 for alignment with the opening 12 and with the opening 14 in the plate 9. A coil spring 15 is operatively connected to the locking pin 11 in the guide 10 for yieldingly urging said locking pin downwardly. An eye 16 on the upper end of the pin 11 is provided for lifting said pin against the tension of the coil spring 15. Fixed on the pin 11 beneath the eye 16 is a washer 17 constituting a stop which is engageable with the guide 10 for positively limiting downward movement of said pin under the influence of the spring 15. As best seen in Figure 3 of the drawing, the pin 11 is operable in the slot 4 for engagement in the aperture 14 in the plate 9.

Briefly, the operation of the device is substantially as follows:

The clevis 7 is connected to the implement and the tractor is positioned in approximately the correct location relative to said implement. The pin 11 is then lifted against the tension of the spring 15 for permitting the member 2 to be slipped forwardly in the member 3 to facilitate connecting the clevis 8 to the tractor. When this has been done the tractor is backed for sliding the member 2 rearwardly in the member 3, the spring loaded pin 11 riding on said member 2. The guide 5 travels in the slot 4 as the member 2 is moved longitudinally in the member 3. When the guide 5 strikes the rear end 6 of the member 3 the opening 13 is in vertical alignment with the openings 12 and 14.

The coil spring 15 then engages the pin 11 in the openings 13 and 14, thereby locking the member 2 in retracted or towing position. The lug 5 is engageable with the plate 9 for preventing separation of the members 2 and 3.

It is believed that the many advantages of a draft hitch constructed in accordance with the present invention will be readily understood and although a preferred embodiment of the device is as illustrated and described, it is to be understood that changes in the details of construction may be resorted to which will fall within the scope of the invention as claimed.

What is claimed is:

1. A draft hitch of the character set forth, comprising a longitudinally extensible bar including telescopically fitted and longitudinally adjustable male and female members, clevises on the rear end portion of the female member and the front end portion of the male member, said members having transverse openings therein for registry when the bar is in unextended position, and a spring pressed pin mounted externally on the female member and engageable in the transverse openings of both members for releasably locking the bar in unextended position, said female member being slotted longitudinally and the male member having a lateral lug on its inner end riding in the slot of the female member and limiting the innermost and outermost positions of the male member in said female member.

2. A draft hitch of the character set forth, comprising a longitudinally extensible bar including a substantially tubular female member having a longitudinal slot therein and further including a male member fitted longitudinally slidable in said female member, said female member including a closed rear end and being open at its front end, an angularly projecting lug on the inner end of the male member slidable in the slot of the female member and engageable with the closed end of the female member to limit the innermost position of the male member, a plate on the female member traversing the slot near the front end of said member, said plate and said female member having aligned transverse openings therein, the male member having a transverse opening therein for alignment with the first-named openings of the female member and plate when said male member is at the innermost limit of its retracted position in the female member, a spring actuated pin mounted on the female member and engageable in the aligned openings of both members for releasably locking the male member in its innermost retracted position, the angularly projecting lug on the inner end of the male member being engageable with said plate for limiting the outermost position of the male member and preventing separation of the male and female members, and clevises on the opposite outer ends of said male and female members.

3. A draft hitch of the character set forth, comprising a longitudinally extensible bar including a solid metallic male member and a tubular metallic female member having a longitudinal slot therein, said male and female members being substantially rectangular in cross section, the male member being slidable longitudinally in the female member and the female member having a rigid closure at its rear end, a plate mounted rigidly on the female member near its front end and traversing the slot therein, said plate and said female member having aligned transverse openings therein, the male member having a transverse opening therein for registry with the first-named openings in said female member and plate when said male member is in its innermost retracted position in the female member, a substantially U-shaped guide mounted vertically externally on the female member, a pin slidable in the guide and engageable in the registering openings of both members for releasably locking the male member in its innermost retracted position, a coil spring in the guide cooperatively connected to the pin for normally urging and reacting for actuating the same to locking position, a handle on the outer end of the pin, an angularly projecting lug on the inner end of the male member slidable in the slot of the female member, said lug being engageable with the rigid end closure of the female member for arresting movement of the male member at its innermost retracted position and with the first and second named transverse openings in registry, said lug further being engageable with said plate on the female member for limiting the outermost position of the male member and preventing separation of the members, and clevises, one on the front end portion of the male member and one on the rear end portion of the female member.

HAROLD R. FORNEY.